April 2, 1957 P. A. D'AURIAC 2,787,430
JOINT FOR HEAVY BELL-SHAPED ANNULAR MEMBERS
Filed Sept. 9, 1953 4 Sheets-Sheet 1
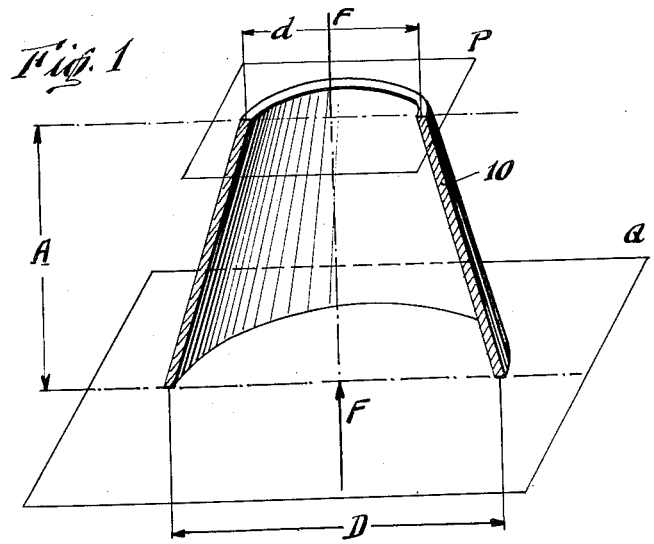
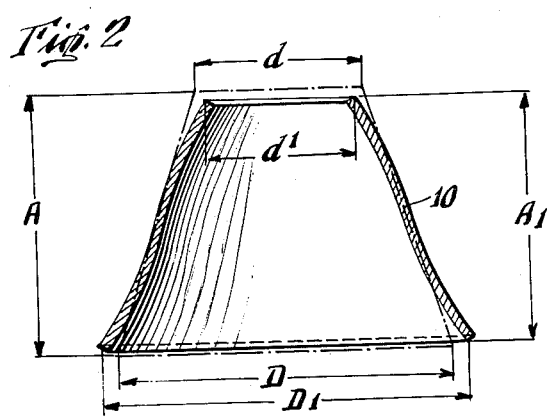
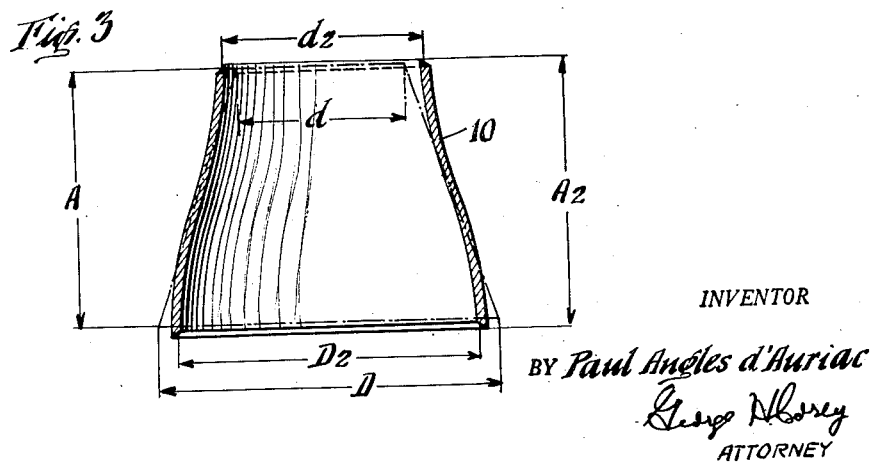
INVENTOR
BY Paul Angles d'Auriac
ATTORNEY April 2, 1957 P. A. D'AURIAC 2,787,430
JOINT FOR HEAVY BELL-SHAPED ANNULAR MEMBERS
Filed Sept. 9, 1953 4 Sheets-Sheet 2
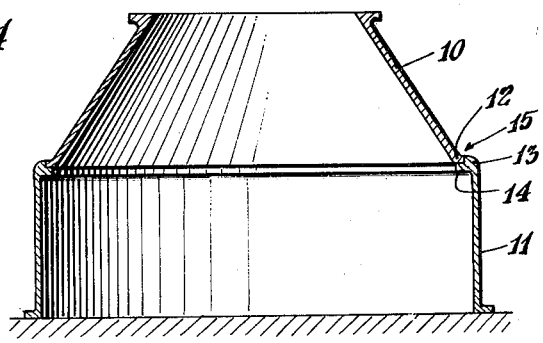
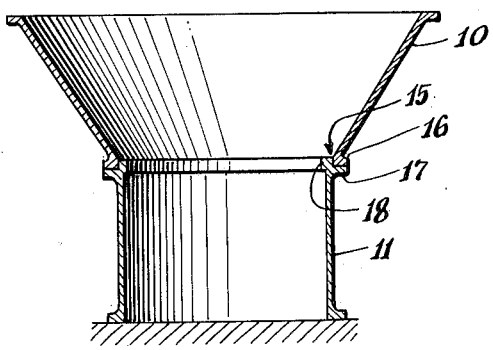
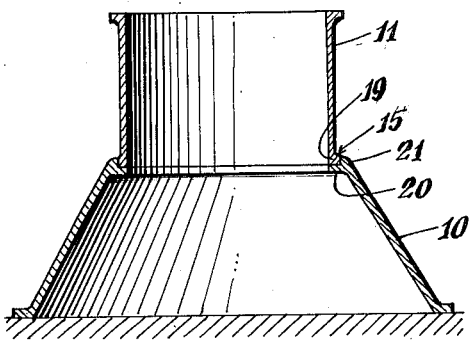
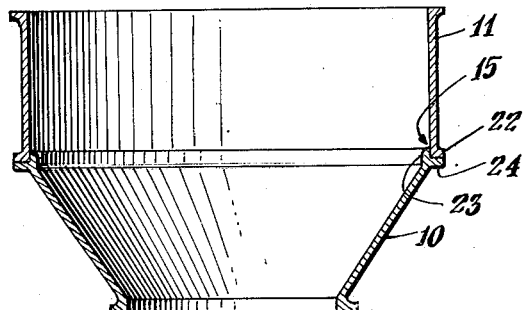
INVENTOR.
BY Paul Angles d'Auriac
ATTORNEY INVENTOR
Paul Angles d'Auriac
ATTORNEY April 2, 1957 P. A. D'AURIAC 2,787,430
JOINT FOR HEAVY BELL-SHAPED ANNULAR MEMBERS
Filed Sept. 9, 1953 4 Sheets-Sheet 4

INVENTOR
BY Paul Anglès d'Auriac
ATTORNEY

United States Patent Office 2,787,430
Patented Apr. 2, 1957

2,787,430

JOINT FOR HEAVY BELL-SHAPED ANNULAR MEMBERS

Paul Angles D'Auriac, Grenoble, France, assignor to Etablissements Neyrpic, Grenoble, France, a corporation of France Application September 9, 1953, Serial No. 379,271

Claims priority, application France September 16, 1952

8 Claims. (Cl. 248—13)

In heavy constructions which require the provision of a hollow annular body of large diameter and considerable weight it is customary to construct such a body of separate superposed pieces in order to reduce the difficulties of moulding and of manufacture or in order not to exceed the limits of size and weight admissible for transportation or to avoid the need for powerful hoisting apparatus at the site at which the construction is erected.

When such a hollow annular body is thus constructed with several superposed pieces, the conventional assembly provides flanges for joining the pieces, the centering of one annular piece upon the other being accomplished by fitting the pieces together. In order that such centering shall be satisfactory it is necessary that the precision of manufacture of the pieces shall be high so that there will not be any lateral play between the superposed pieces. For this reason up to the present in accordance with practice in usual mechanical pieces, tight fits are provided for joining the pieces one with the other. Where heavy constructions are concerned, however, in which the diametral dimensions may be of the order of several meters and the weight of the order of several dozens of tons, the structure supporting several hundreds of tons, such ordinary joining of the pieces in the assembly offers considerable difficulty. The piece to be put in place must be maneuvered by a crane. Where, as in a hydroelectric generator, the axis is vertical the axis of the piece must be absolutely vertical in order that there shall be no jamming when the actual joining begins. Considerable patience and time are necessary for the usual handling but it is the problem of mounting one piece upon the other which remains difficult and troublesome.

The present invention has for an object means for centering and fixing one hollow annular piece generally of bell shape on another in heavy constructions which have the characteristic that the bell shaped piece is deformed under its own weight or a load thereon or a force that it must support, thereby determining a change of the diameter of the parts provided for joining, the lateral walls of the hollow piece being subjected to elastic deformation.

The means for centering and fixing which are the object of the invention provide for the fitting of one annular piece of bell shape on another annular piece at adjacent annular ends thereof in accordance with a systematic or predetermined play or allowance in the dimensions in the manufacture of the piece. This play or allowance is less than the change in the diameter of the bell shaped piece produced under a force acting thereon due to the weight of the piece, a load thereon or a force which it must support, this change taking place in a direction which tends to offset the play or allowance.

The invention will be further described in connection with the drawings in which:

Figs. 1, 2 and 3 show diagrammatically the phenomenon on which the invention rests, Fig. 1 representing in perspective a diametral section of a hollow piece in the form of a truncated cone, the contour of the end bases of the cone being shown without deformation.

Figs. 2 and 3 represent the truncated conical piece subjected to deformations respectively under compression and tension, these forces acting parallel to the axis of the cone.

Figs. 4 to 11 show in diametral section and to relatively small scale the assemblies of heavy pieces utilizing the form of joining in accordance with the invention, these figures showing various embodiments according to the direction of the action of the forces to which the bell shaped pieces in the assembly are subjected.

Figure 8:
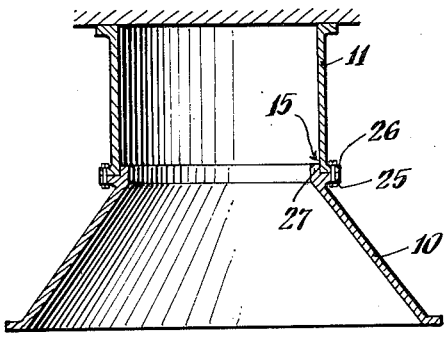

In the theoretical diagrams of Figs. 1 to 3 inclusive a hollow body 10 is shown having a small wall thickness relative to its diametral dimensions, this body being in the form of a truncated cone which is quite open because the slope of the wall is relatively small. For the purposes of clarity the body is shown only by a section of this wall in the diametral plane and by the contour in perspective of its annular bases assumed to be contained in the two parallel planes P and Q in the unstressed condition of Fig. 1. The contour of these end bases departs from these planes as shown in Figs. 2 and 3 when the truncated conical body is stressed under a compression force in Fig. 2 and under a tension force in Fig. 3, these forces acting parallel to the axis of the cone. The height of the body as manufactured and unstressed as in Fig. 1, that is, the distance between the planes P and Q, is A and the average diameter is $d$ for the small base and D for the large base. In a simple concept the body 10 may be considered to be of truncated annular form with a wall of constant thickness and without weight and initially without deformation, the wall, however, being capable of being deformed but being resistant to and resilient under such deformation.

If at the end faces of this annular truncated or frusto-conical body two equal and opposite forces are applied which, therefore, balance each other, as is the case when one force is a load supported by the hollow body and the other is the reaction of its support, both these forces acting parallel to the axis, the hollow body is subjected to deformation. If these forces are directed one toward the other, the body is subjected to compression and tends to take the profile of a bell which is represented in Fig. 2, the mean diameter of the small base $d$ becoming $d_1$ and the diameter D of the large base becoming $D_1$. The height A in this case is diminished and becomes $A_1$, as shown in Fig. 2. Due to these deformations the end surfaces become slightly truncated in the directions as shown in Fig. 2.

If, on the other hand, the forces acting parallel to the axis of the cone are oppositely directed, the body 10 is subjected to tension and is deformed to the form shown in Fig. 3 with a corresponding increase of the small base diameter $d$ to diameter $d_2$ and reduction of the large base D to the diameter $D_2$. The height A is increased to $A_2$. As in the preceding case the annular end surfaces have become slightly truncated, the directions of the slope as shown in Fig. 3 being opposite to those of the form of Fig. 2.

If these principles are carried out in practice in a heavy annular bell shaped piece of large diameter subjected to load in addition to its own weight the changes of diameter which are developed become appreciable. Thus, for example, for a body of several meters diameter and for a load of several hundred tons thereon the changes in diameter may be of the order of a millimeter.

In accordance with the invention these changes in diameter are utilized in order to accomplish the fitting of a heavy bell shaped piece on another piece by providing in the manufacture of these pieces a systematic or predetermined play or allowance in the diametral dimensions which facilitates the operation of engaging the adjacent annular ends of the pieces in making the joint between these pieces when one is mounted upon the other. The diametral play or allowance is so determined that one annular end of the bell shaped piece may be engaged with the adjacent annular end of the other piece with clearance provided by the predetermined play or allowance. In providing this play or allowance account is taken of the deformations which the pieces themselves have and those which they will develop under the effect of various loads and forces to which they will be subjected. The changes in diameter which correspond to the modification of the form in the manner described in connection with Figs. 1 to 3 inclusive are provided in the pieces so that these changes offset or compensate for the play or allowance and assure pressure of a peripheral surface on one piece against a peripheral surface on the other piece at the adjacent annular ends with tightening of the walls of one piece upon the other at the joint. Centering or axial alignment of one annular piece with the other thereby is assured by the mounting and the bringing of one piece into proper position with respect to the other has been greatly facilitated.

In putting into practice the means which are the object of the invention it is manifestly necessary to choose a manner of assembly or a form of the joint such that the lateral peripherally extending surface of a shoulder of one piece may be exterior or interior with respect to the lateral peripherally extending surface of a projection or a rabbet of the other piece according as there tends to be produced an increase or decrease of the diameter of this projection.

Several embodiments will be described in connection with Figs. 4 to 11 inclusive and in each case in correspondence with Fig. 1 the bell shaped piece will be designated by the numeral 10. If there are two such pieces in the assembly, the others will be designated as 10' and 10''. The other pieces will be designated as 11.

In Fig. 4 a piece 11 of cylindrical form rests on a support, for example a foundation, and supports the bell shaped piece 10. This bell shaped piece is truncated and is provided with an annular wall. The piece 10 at its large base rests on the piece 11. The joint is formed by the fitting of a lower flange 12 of the bell shaped piece in a shoulder formed at the top of the piece 11, this shoulder being within an exterior rim 13 and an internally projecting rib 14. By providing in the manufacture of the pieces a predetermined play or allowance, as referred to above, between the diameter of the outer cylindrical surface of the flange 12 and the diameter of the cylindrical surface of the shoulder in the piece 11 provided between the portions 13 and 14, the piece 10 may be brought to position in engagement with the shoulder of piece 11 without difficulty because of the clearance provided by the play or allowance. When the piece 10 is put in place, however, and the weight thereof and the force of any load which it carries is brought thereon and on the piece 11 to transfer these forces to the foundation, the diameter of the larger end of the piece 10 tends to increase so that the cylindrical surface of the flange 12 thereof approaches the cylindrical surface of the shoulder of the piece 11. If the play existing when the pieces are brought together is slightly less than the increase in diameter which the elastic deformation of the bell shaped piece tends to produce, the two cylindrical surfaces come squarely into engagement and form at 15 a joint which insures accurate centering of the two pieces one upon the other. If the predetermined play or allowance, although sufficient to permit easy placing of the bell shaped piece 10 in position in engagement with the piece 11, is nevertheless smaller than the increase in diameter of the flange 12 if such increase were not limited by the lateral cylindrical wall of the shoulder, there is produced a strong pressure of the adjacent portions of the walls of the pieces one upon the other similar to a binding which makes the pieces solid or unitary and thus makes it possible to reduce if not to eliminate entirely the usual fastening means such as bolts.

If the assembled pieces must support a large load the force of such tightening increases as the load increases. The means provided in the invention, therefore, is of particular value for pieces of very large diameter supporting very large loads or forces, since the greater such load or force the more positively are the pieces held together while at the same time being held in proper axial alignment.

Conversely, when the load is removed the bell shaped piece which by its deformation has been tightened against the other piece by virtue of its resistance tends to be loosened from the other piece and, if traction is placed on this bell shaped piece by a hoisting machine, the play or allowance reappears and makes it possible to raise the bell shaped piece from engagement with the other piece without difficulty. The significance of the means which is provided in accordance with the invention is apparent, therefore, both for assembly of the pieces and for disassembly thereof.

Fig. 5 differs from Fig. 4 by the fact that the bell shaped piece 10 rests at its small end on the piece 11 which is cylindrical as in the preceding case. As will be understood from Fig. 5 and the above explanation, the deformation of the bell shaped piece 10 in Fig. 5 tends to reduce the diameter of the small end of piece 10. The lateral peripheral surface in the piece 11 against which the corresponding lateral peripheral surface in the piece 10 comes to bear must be disposed within the annulus of the small end of the piece 10. In this embodiment the bell shaped piece 10 is terminated by a flange or reinforced portion 16 at its small end and provides at this portion an interior cylindrical wall which comes into engagement with the exterior cylindrical surface of the prolongation 18 of the wall of the piece 11 which may be provided by an increased thickness of this wall. The diameters of the cylindrical surfaces of the two pieces in the unstressed condition provide for the predetermined play or allowance which has been referred to above in order that the tightening or pressure of one cylindrical surface against the other may take place when the pieces 10 and 11 are subjected to a compression load or force.

In the embodiments of Figs. 6 and 7 the pieces are disposed in inverted relation respectively with reference to Figs. 5 and 4. In Figs. 6 and 7 the bell shaped piece 10 is the lower piece resting on the support or foundation and the other piece 11 which as in Figs. 4 and 5 is of cylindrical form is supported by the bell shaped piece 10. The joints between the two pieces at respectively the small and large annular ends of the bell shaped piece are of the opposite or complementary form in relation to the joints shown and described in connection respectively with Figs. 5 and 4. In Fig. 6 the cylindrical surface at the small annular end of the bell shaped piece is disposed inwardly toward the axis with respect to the annular wall of the piece 10, the supporting flange 20, however, being internal on the piece 10. In Fig. 7 a cylindrical surface is disposed on the piece 10 outwardly of the wall with respect to the axis, the supporting flange 24 being external.

When the pieces are being assembled with the joint at the small end of the bell shaped piece 10 as in Fig. 6, the diameter of this end tending to decrease because of the deformation above described when a force of compression is applied to the pieces parallel to the axis, the cylindrical contact wall or surface 15 is interior with respect to the piece 10. The upper piece 11, which may be reinforced in thickness at 19 at its lower base to provide an outer cylindrical surface thereon, joins bell shaped piece 10 in a shoulder formed at the small end of the bell shaped piece between the internal rib or flange 20 and a prolongation 21 of the wall of the piece 10.

When the joint is made at the large annular end of the bell shaped piece 10 as in Fig. 7, this end tending to increase in diameter by deformation of the bell shaped piece under compression load the cylindrical surface on the piece 10 for contact is exterior. The upper piece 11 is engaged at the inner cylindrical surface of the reinforced end 22 of the wall thereof with the prolongation 23 of the wall of the piece 10 and bears on the exterior flange 24 of the bell shaped piece 10. The cylindrical surface of the portion 22 of the piece 11 thereby is brought into engagement with the exterior cylindrical surface of the prolongation 23 of the piece 10 when under the force of compression enlargement of the diameter of the large annular end of the piece 10 takes place.

Figure 9:
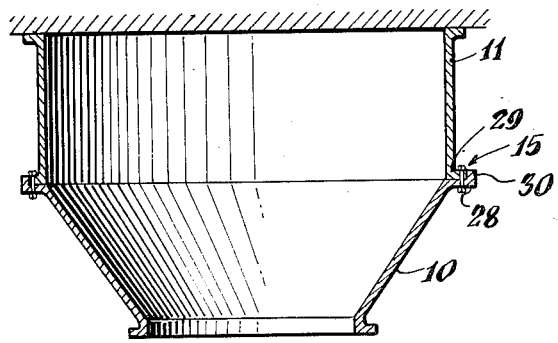

In the embodiments so far described the bell shaped piece is disposed in various positions with reference to the other piece but in each case the pieces are subjected to a force of compression acting parallel to the axis of the pieces. Figs. 8 and 9 show embodiments in which the pieces are subjected to tension, this force also acting in the direction parallel to the axis. The deformations which take place then are in the opposite directions to those which are developed in the embodiments of Figs. 4 to 7 inclusive.

In Fig. 8 the cylindrical piece 11 is suspended from a support and supports a bell shaped piece 10 depending therefrom with the large annular end of this bell shaped piece disposed downwardly. The piece 10, being assumed to be loaded by a mass which it supports, subjects the piece 10 to a downwardly directed tension. This tension force tends to increase the diameter of the small annular end of the piece 10 in the manner described, lateral contact being made at 15 between the peripheral surfaces. The peripheral surface for contact on the piece 11 is disposed inwardly toward the axis and the corresponding surface on the piece 10 is disposed outwardly thereof with respect to this axis. The assembly, therefore, in this embodiment is of the type shown in Figs. 5 and 7 in the sense that the lateral or peripheral contact surface is exterior on the lower piece. In order, however, that the lower piece shall be supported while the assembly is being carried out a flange 25 is provided on the lower bell shaped piece 10 which extends outwardly of the wall thereof and this flange may be bolted against a flange 26 which extends outwardly from the lower end of the wall of the piece 11. The joint in accordance with the invention is made between the outer circumferential surface of the reinforcing prolongation 27 of the wall of the piece 10 and the inner circumferential surface of the piece 11, the centering of one piece on the other being insured by the tightening of the walls at these surfaces at 15.

If, as is shown in Fig. 9, the suspended assembly comprises a lower piece 10 of bell shape carried at its larger annular end by the other piece 11, the force of tension or traction tends to diminish the diameter of this larger annular end of the piece 10. The piece 10, therefore, must engage with the other piece at an interior surface of the lateral wall of the piece 10, this interior surface engaging an exterior surface on the piece 11. Otherwise stated, the upper annular end of the lower piece 10 fits over the lower annular end of the upper piece 11. To this end the pieces 10 and 11 in this embodiment are provided respectively with flanges 28 and 29 which may be brought one against the other and bolted. The flange 28, however, is provided with an annular rim 30 which in reducing its diameter under the force of traction is tightened against the exterior surface of the flange 29 on the piece 11. As these contacting surfaces may be of cylindrical form, the centering of the piece 10 on the axis of the piece 11 is assured.

The two embodiments of Figs. 8 and 9 are somewhat unusual due to the fact that before its deformation the bell shaped piece must be suspended under the other piece by the fastening bolts. It is necessary that these bolts shall not be tightly set up so that when the force of tension is brought upon the pieces the requisite deformation may take place to bring the joining surfaces into engagement in the manner described. In order that the pieces may be brought initially into position with the play therebetween, if necessary, the bell shaped piece may be raised into position in such a manner as not to counteract the provision for play between the two ends to be joined. To this end it is sufficient that the force for lifting shall be exerted at the lower base of the bell shaped piece in the two embodiments of Figs. 8 and 9. Due to its weight the piece 10 then is subjected to a compression which tends to produce changes in the diameter of the respective ends thereof in Figs. 8 and 9 which will provide the play, this play corresponding to a decrease in the diameter of the small annular end in Fig. 8 and an increase in the diameter of the large annular end in Fig. 9.

Figure 10:
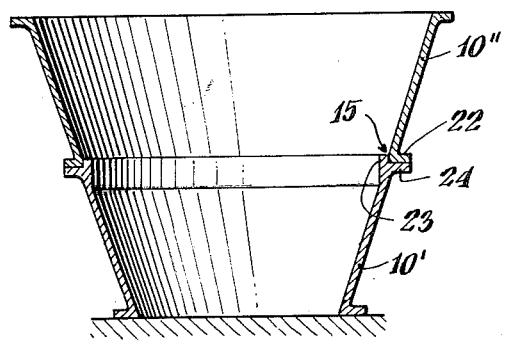

Within the scope of the invention both of the pieces to be joined may be of bell shape. If the slopes of these two pieces are in the same direction, then each piece by virtue of its deformation contributes to the tightening of the lateral wall of one against the other. In Fig. 10, for example, the lower bell shaped piece 10' rests on a foundation at its small annular end and the bell shaped piece 10" at its smaller annular end engages the larger annular end of the piece 10'. The upper piece 10" fits to the lower piece 10' in the manner similar to that described in connection with Fig. 7. As in Fig. 7 the larger end of the lower bell shaped piece 10' increases in diameter under the compressive force, thus tending to make the prolongation 23 of the wall of the piece 10' bear at its outer peripheral surface against the internal peripheral surface of the reinforcing flange 22 of the upper piece 10". Since, however, this upper piece 10" also is of bell shape it likewise tends under compression to diminish the diameter of its smaller annular end which is in engagement with the larger annular end of the piece 10'. The predetermined difference in diameter of the surfaces to be brought into engagement, therefore, which provides the requisite play or allowance may be double that which, other things being equal, would be provided when only one of the pieces is of bell shape.

Figure 11:
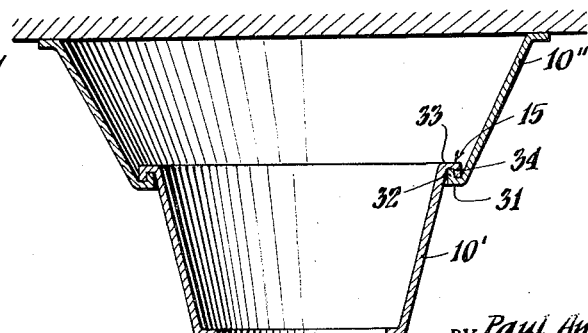

Fig. 11 shows an embodiment in which the pieces both of bell shape are subjected to traction or tension. The bell shaped piece 10" is suspended at its larger annular end and supports the bell shaped piece 10' depending therefrom also at its larger end. The pieces are hung one upon the other. To this end the upper piece 10" provides an annular peripheral wall 31 rimmed interiorly by an annular flange 32. The lower piece is introduced into the first from above before suspension of the piece 10". The piece 10' is provided at its larger annular end with an exterior collar 33 connecting an annular flange 34 to the wall of the piece 10'. Under the force of traction to which the piece 10' is subjected this flange 34 tends to decrease in diameter while under this force the bell shaped piece 10" tends to enlarge its smaller end, increasing the diameter of the annular flange 32. The flanges 32 and 34 then bear against each other with a binding pressure which depends upon the play or allowance provided therebetween in the unstressed condition. This embodiment may be compared with that of Fig. 9 with the difference that the lower piece 10' is hung upon the other by the interengaging flanges instead of being suspended by means of bolts until the binding at the peripherally extending surfaces takes place due to the deformation of the pieces in the manner described.

If the suspended pieces both were divergent downwardly it would be possible to provide a suspension of the lower piece under the upper piece such that the action of deformation would be similar to that which takes place in Fig. 8. It also will be understood that in the embodiments of Figs. 8 and 9 it is possible to provide a suspension by means of interengaging flanges of the type described in connection with Fig. 11, the peripheral surfaces to be brought into engagement being disposed on the pieces in accordance with the concepts above set forth.

Within the scope of the invention the walls of the bell shaped piece may be generated by non-rectilinear or curvilinear lines providing that the piece shall be of general bell shape and that its wall for a large part of its length shall have a sufficiently slight slope. In an assembly of such pieces at least one of the pieces may be given such a non-rectilinear bell shape.

When the pieces which are to be assembled are cast the provision of the means for joining according to the invention makes possible an easier mounting.

Figure 12:
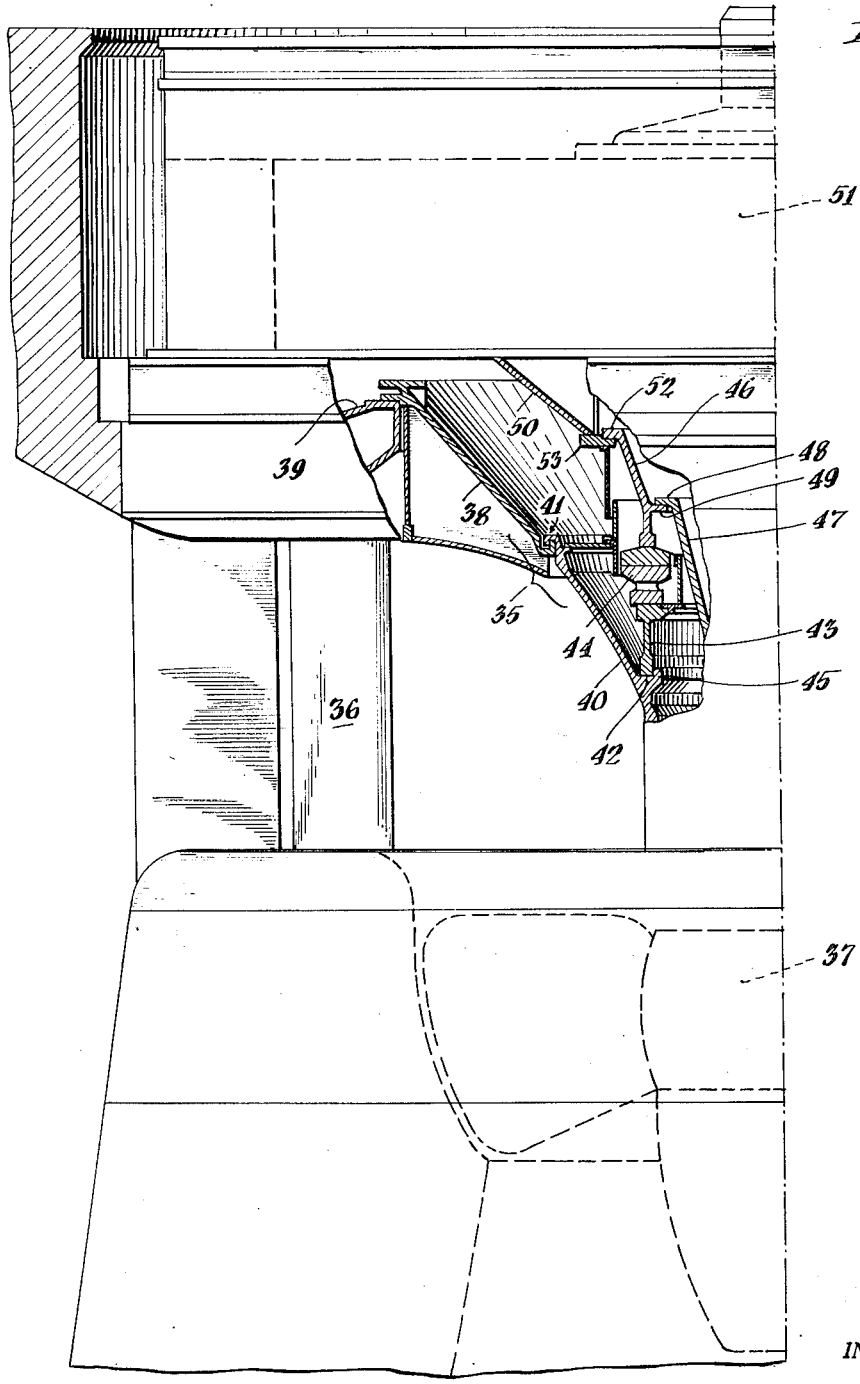
Fig. 12 shows a practical application in a turbo-alternator having a vertical axis, this machine being represented partially in axial half section and partially in half elevation.

Fig. 12 shows in a practical embodiment the utilization of the means described above, this embodiment being in a turbo-alternator having a vertical axis of rotation of the rotor thereof. The support for the rotating assembly is shown at 35 which provides a continuous wall of downwardly convergent outline for directing the stream entering through the passage 36 towards the turbine runner 37. The support 35 by reason of its great height and of its large diameter is formed of two bell shaped pieces 38 and 40. The piece 38 is flanged at its larger end for bearing on the upper flange 39 of the distributor. The other piece 40 is hung at 41 at its larger end on the piece 38 in the manner described in connection with Fig. 11.

The piece 40 is provided with an interior projection 42 on which is carried a cylindrical annulus 43 supporting an abutment 44 on which is carried all the weight of the rotating part. When the parts are unstressed the annulus 43 engages with a systematic or predetermined play or allowance therebetween a shoulder 45 which rims the interior projection 42. Under the force of the weight which it supports and of the force in the same direction of the water acting on the runner of the turbine the piece 40 is subjected to a considerable tension force and increases its diameter at the smaller annular end thereof so that the shoulder 45 bears against the lower base of the annulus 43, thus centering this annulus with respect to the piece 40. The piece 40 itself is centered in the piece 38 by engagement at 41 of the cooperating peripherally extending surfaces of the annular flanges provided respectively on the pieces 40 and 38 in the manner described in connection with Fig. 11.

The rotating assembly, if it is of the type of construction described in the application for patent filed September 5, 1952 in France for "Improvements in the Construction and Mounting of the Rotatable Assembly of a Hydroelectric Unit Rotating on a Vertical Axis," now Patent No. 1,063,334, is composed of superposed collars suspended from the collar of the abutment member 46. For reasons of demounting the truncated collar 47 which is suspended from the abutment member 46 is provided with a flange 48 at its large base bearing on an interior rib 49 of the abutment member 46. The means of the invention are not utilized in the joint between the flange 48 and the rib 49 because favorable conditions for such use are not secured, the slope of the cone of the collar 47 being small.

On the other hand, the abutment member 46 may be assembled with the collar 50 situated above the abutment member 46, the joint between these parts being made in accordance with the invention. The collar 50 is quite bell shaped so as to adapt it to the large diameter of the fly wheel or rotor 51 of the alternator and this collar 50 supports the considerable weight of this fly wheel. Assembly is secured by means of a flange 52 provided on the abutment member 46 which fits with a predetermined lateral play in a shoulder of a flange 53 carried by the collar 50. The flanges 52 and 53 may be bolted together.

The two bell shaped pieces 46 and 50, being subjected to a strong force of compression due to the weight of the fly wheel, the diameter of the fitted flange 52 which is at the larger annular end of the abutment member 46 tends to increase while the diameter of the shoulder of flange 53 which is at the smaller end of the bell shaped piece 50 tends to decrease. These tendencies, therefore, are in such direction as to offset or cancel the predetermined play or allowance provided in the manufacture of these pieces and, by reason of the larger diameter of the flanges and of the appreciable deformation of the two pieces due to the great stress to which they are subjected, not only is there secured a positive and exact centering of the pieces one relative to the other but a strong binding of the two one against the other also is secured. It is expedient that the division and the disposition of the masses of the parts of the apparatus shall be such that the tendency to tightening or binding of the pieces together shall not be counteracted by the effect of centrifugal force of the rotating parts.

The invention is not intended to be limited to the particular embodiments disclosed and is applicable to any constructions in which hollow or annular pieces are joined at adjacent annular ends thereof, one of the joined pieces being tapered or of conical or frusto-conical form.

What I claim is:

1. In a structure having two annular pieces of large size and heavy weight disposed in coaxial end to end relation to each other and joined at the adjacently disposed ends thereof, a joining construction of said pieces in which at least one of said pieces generally tapers lengthwise of said axis between the ends thereof, said tapering piece being open at least at the end thereof adjacent the other piece, said tapering piece being elastically deformable to decrease the diameter of the smaller end thereof and to increase the diameter of the larger end thereof under a compression stress and to increase the diameter of the smaller end thereof and to decrease the diameter of the larger end thereof under a tension stress, said stresses being exerted generally parallel to said axis, said tapering piece at a given end thereof joined to said other piece at said adjacent end of said other piece being provided with a peripheral surface extending about said axis and disposed at the side of the annulus of said tapering piece which is toward the direction of change in the diameter of said given end under said stress, said other piece providing a peripheral surface extending about said axis and disposed at the side of the annulus of said other piece that is opposite to said direction of change of said diameter of said given end of said tapering piece, the diameters in the unstressed condition of said peripheral surfaces of said given end of said tapering piece and of said adjacent end of said other piece being different in the direction which provides clearance between said surfaces, the amount of said clearance at most being equal to said change in diameter of said given end of said tapering piece developed upon said elastic deformation of said tapering piece at least to bring said peripheral surfaces of said pieces in stressed condition into engagement.

2. In a structure having two annular pieces of large size and heavy weight disposed in coaxial end to end relation to each other and joined at adjacent ends thereof, a joining construction of said pieces in which at least one of said pieces is of frusto-conical form, said frusto-conical piece being open at least at the end thereof adjacent the other piece, said frusto-conical piece being elastically deformable to decrease and increase the diameter of the smaller end thereof respectively under a compression stress and a tension stress and to increase and decrease the diameter of the larger end thereof respectively under a compression and a tension stress, said stresses being exerted on said piece generally parallel to the axis of the cone, said frusto-conical piece at a given end thereof joined to said other piece providing an annular wall having a peripheral surface extending generally parallel to and about the axis of the cone and disposed at the side of said wall of said frusto-conical piece which is toward the direction of change in the diameter of said given end, said other piece at said adjacent end thereof providing an annular wall having a peripheral surface extending generally parallel to and about said axis and disposed at the side of said wall of said other piece that is opposite to the direction of said change of diameter of said given end of said frusto-conical piece, the diameters in the unstressed condition of said peripheral surfaces of said given end of said frusto-conical piece and of said adjacent end of said other piece being different in the direction which provides clearance between said surfaces and by an amount at most equal to said change in diameter of said given end of said frusto-conical piece developed upon said elastic deformation of said frusto-conical piece at least to bring said surfaces of said pieces in stressed condition into engagement.

3. In a structure having two annular pieces, the joining construction as defined in claim 2, said annular wall of said frusto-conical piece at its smaller end providing a cylindrical surface at the side of said wall of said frusto-conical piece disposed toward said axis, said other piece providing at said adjacent end thereof a cylindrical surface at the side of said wall of said other piece disposed outwardly with respect to said axis for engagement with said cylindrical surface of said wall of said frusto-conical piece upon said deformation of said frusto-conical piece under compression stress acting generally parallel to said axis.

4. In a structure having two annular pieces, the joining structure as defined in claim 2, said annular wall of said frusto-conical piece at its larger end providing a cylindrical surface at the side of said wall of said frusto-conical piece disposed outwardly with respect to said axis, said other piece providing at said adjacent end thereof a cylindrical surface at the side of said wall of said other piece disposed inwardly toward said axis for engagement with said cylindrical surface of said wall of said frusto-conical piece upon said deformation of said frusto-conical piece under compression stress acting generally parallel to said axis.

5. In a structure having two annular pieces, the joining construction as defined in claim 2, said annular wall of said frusto-conical piece at its smaller end providing a cylindrical surface at the side of said wall of said frusto-conical piece disposed outwardly with respect to said axis, said other piece providing at said adjacent end thereof a cylindrical surface at the side of said wall of said other piece disposed inwardly toward said axis for engaging with said cylindrical surface of said wall of said frusto-conical piece upon said deformation of said frusto-conical piece under tension stress acting generally parallel to said axis.

6. In a structure having two annular pieces, the joining construction as defined in claim 2, said annular wall of said frusto-conical piece at its larger end providing a cylindrical surface at the side of said wall of said frusto-conical piece disposed toward said axis, said other piece providing at said adjacent end thereof a cylindrical surface at the side of said wall of said other piece disposed outwardly with respect to said axis for engaging with said cylindrical surface of said wall of said frusto-conical piece upon said deformation of said frusto-conical piece under tension stress acting generally parallel to said axis.

7. In a structure having two coaxial annular frusto-conical pieces of large size and heavy weight disposed in end to end relation to each other, the larger end of a given piece being joined to the smaller end of the other piece, said frusto-conical pieces at said adjacent ends thereof being open, a joining construction of said pieces in which said pieces each provides an annular wall extending about the common axis, said pieces each being elastically deformable to decrease the diameter of the smaller end thereof and to increase the diameter of the larger end thereof under a compression stress, said stress being exerted on said pieces generally parallel to the common axis thereof, said given frusto-conical piece providing on a portion of the wall thereof at said large end thereof a substantially cylindrical surface coaxial with said axis and disposed at the side of said wall outwardly with respect to said axis, said other frusto-conical piece providing on a portion of the wall thereof at said smaller end thereof a substantially cylindrical surface coaxial with said axis and disposed at the side of said wall of said other frusto-conical piece inwardly toward said axis, said cylindrical surfaces being formed on the respective pieces in unstressed condition with the diameter of said larger end cylindrical surface of said given frusto-conical piece smaller than the diameter of said smaller end cylindrical surface of said other frusto-conical piece by an amount at most equal to the sum of the respective increase and decrease of the diameters of said adjacent ends of said given and said other frusto-conical pieces so as at least to bring said cylindrical surfaces into engagement upon said elastic deformation of said pieces under a compression stress acting generally parallel to said common axis.

8. In a structure having two coaxial annular frusto-conical pieces of large size and heavy weight disposed in end to end relation to each other, the larger end of a given piece being joined to the smaller end of the other piece, said frusto-conical pieces at said adjacent ends thereof being open, a joining construction of said pieces in which said pieces each provides an annular wall extending about the common axis, said pieces each being elastically deformable to increase the diameter of the smaller end thereof and to decrease the diameter of the larger end thereof under a tension stress, said stress being exerted on said pieces generally parallel to the common axis thereof, said given frusto-conical piece providing on a portion of the wall thereof at said large end thereof a substantially cylindrical surface coaxial with said axis and disposed at the side of said wall inwardly toward said axis, said other frusto-conical piece providing on a portion of the wall thereof at said smaller end thereof a substantially cylindrical surface coaxial with said axis and disposed at the side of said wall of said other frusto-conical piece outwardly with respect to said axis, said cylindrical surfaces being formed on the respective pieces in unstressed condition with the diameter of said larger end cylindrical surface of said given frusto-conical piece larger than the diameter of said smaller end cylindrical surface of said other frusto-conical piece by an amount at most equal to the sum of the decrease and increase of the respective diameters of said adjacent ends of said given and said other frusto-conical pieces so as at least to bring said cylindrical surfaces into engagement upon said elastic deformation of said pieces under a tension stress acting generally parallel to said common axis.

References Cited in the file of this patent

UNITED STATES PATENTS

| | | |
|---|---|---|
| 898,995 | Simpson | Sept. 15, 1908 |
| 971,371 | Hale | Sept. 27, 1910 |
| 1,037,265 | Kirkpatrick | Sept. 3, 1912 |
| 1,097,306 | Doerr | May 19, 1914 |
| 1,507,138 | Pierce | Sept. 2, 1924 |
| 1,950,947 | Mulroyan | Mar. 13, 1934 |
| 2,024,330 | Bemis | Dec. 17, 1935 |
| 2,469,949 | Cantrell | May 10, 1949 |
| 2,572,437 | Bozarth | Oct. 23, 1951 |